Figure 1:
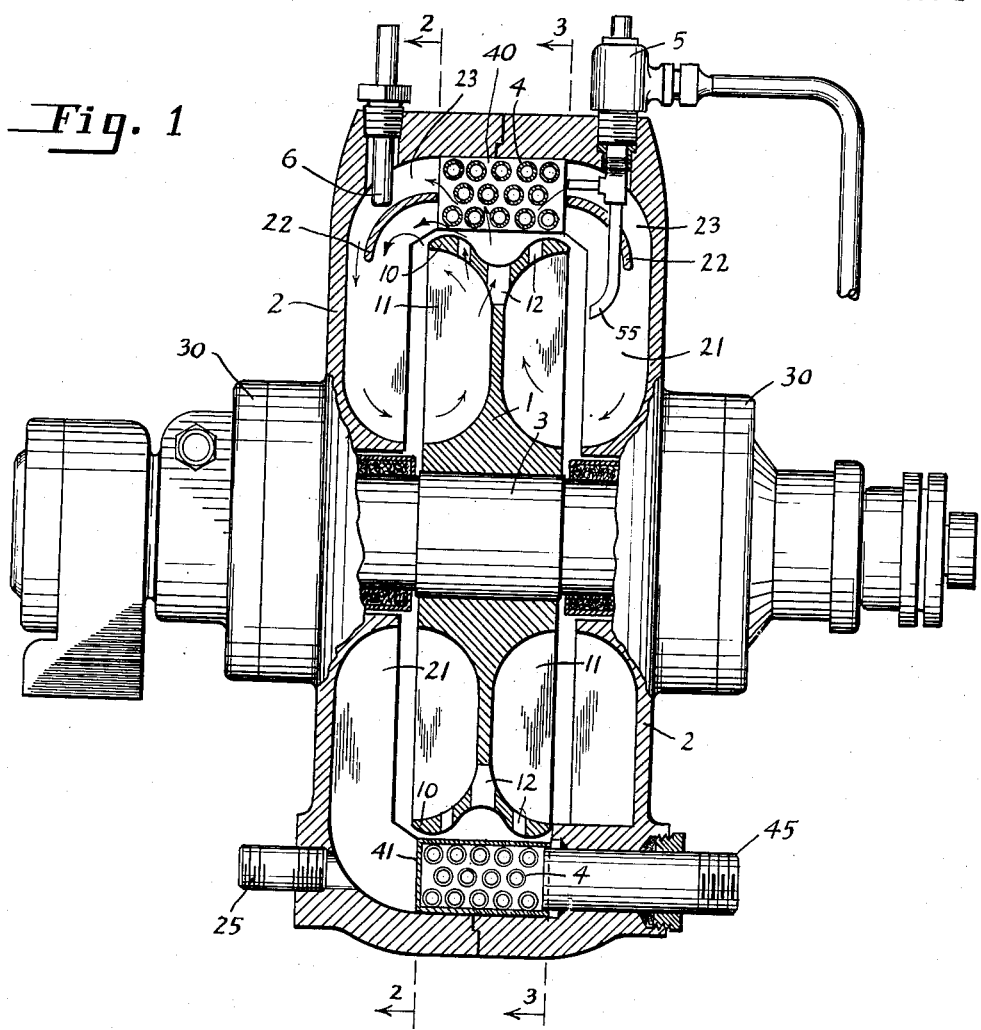

March 23, 1954 H. L. BENNETT 2,672,954
DYNAMOMETER
Filed Sept. 23, 1947 2 Sheets-Sheet 1

INVENTOR.
Harold L. Bennett
BY
Reynolds & Beach
ATTORNEYS

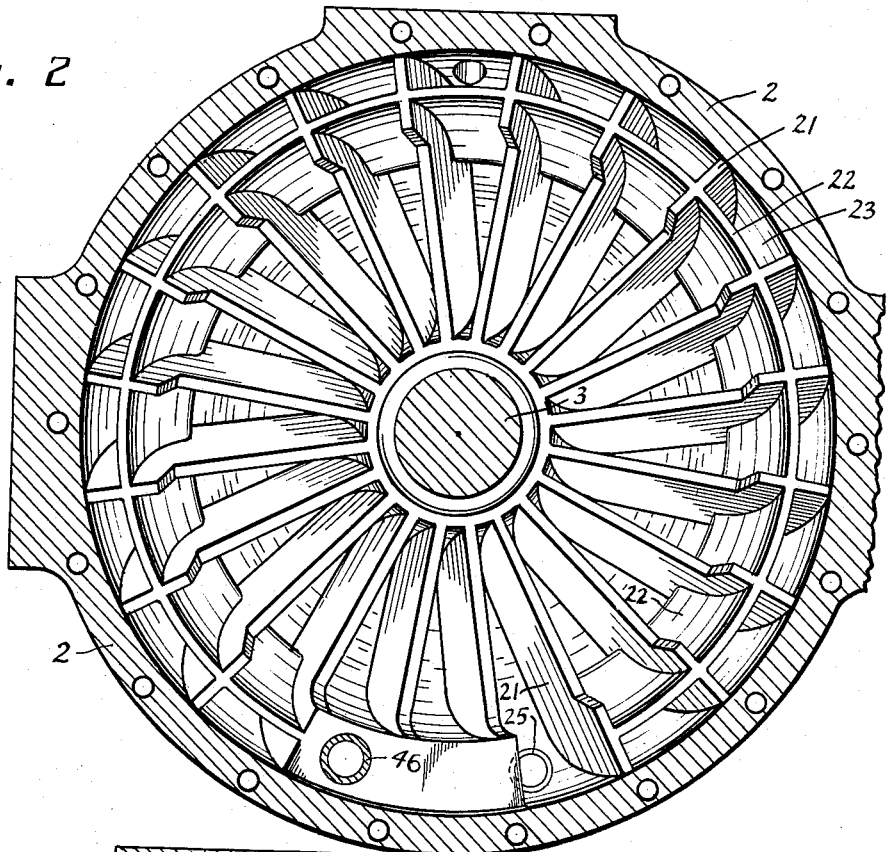
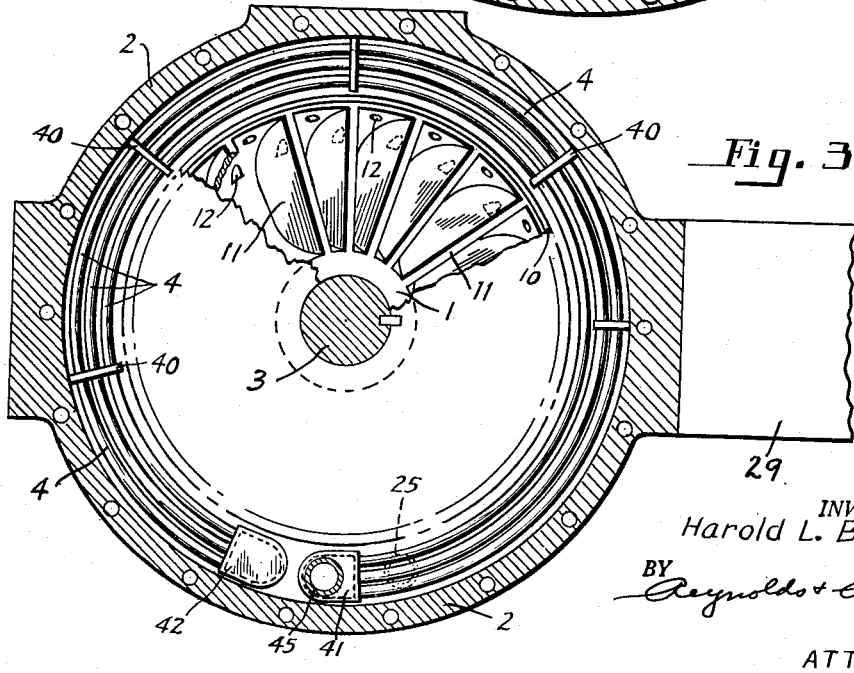

Patented Mar. 23, 1954

2,672,954

UNITED STATES PATENT OFFICE 2,672,954

DYNAMOMETER

Harold L. Bennett, South Bend, Ind., assignor, by mesne assignments, to Clayton Manufacturing Company, El Monte, Calif., a corporation Application September 23, 1947, Serial No. 775,684

12 Claims. (Cl. 188—90)

The present invention concerns a Froude type dynamometer, wherein a radially vaned rotor is rotattable within a complementally vaned stator casing, to produce a toroidal circulation path for such resistance liquid as is contained within the stator casing, and thus the resistance to change of direction of the liquid produces a tendency for the stator casing to rotate with the rotor, which tendency can be precisely measured to determine the torque and hence the power output of the power source which effects rotation of the rotor. Such dynamometers are useful in measuring the torque at the driving wheels of an automobile's engine, under simulated load conditions but while the vehicle remains stationary.

Such a dynamometer, so used, was disclosed in my application Serial No. 379,581, filed February 19, 1941, which issued September 30, 1947, as Patent No. 2,428,005, and which was copending with this application. Certain structures and principles herein disclosed are divided from that application, and are supplemented by certain additional features not disclosed in the earlier, parent application. Certain allied structures and principles, likewise disclosed in that parent application, constitute the subject-matter of a copending application, Serial No. 649,967, filed February 25, 1946, which likewise was divided from the same parent application.

As explained in that parent application, and as more fully explained in the copending application, Serial No. 649,967, entitled Cooling Means for Dynamometers, the accuracy of such dynamometers depends to a large degree upon the maintenance of stable test conditions, particularly the maintenance of substantially constant low temperatures in the resistance liquid, which is usually water. Since it is undesirable and impracticable to exhaust heated resistance liquid continuously or from time to time, and to replace it with precisely the same amount of cool resistance liquid, in order to maintain constant volume and constant temperature within the resistance chamber, it is practicable only to seal in the resistance chamber at a given time or for a given test a predetermined quantity of resistance liquid, and then by separate cooling means to maintain that resistance liquid at a substantially constant temperature. By proper controls, thermostatically or otherwise actuated, the circulation of separate coolant in a water jacket or in cooling coils within the resistance chamber can be maintained at such rate as will dissipate all excess heat in the resistance liquid, and maintain the latter at a substantially constant temperature. The mechanism and controls to this end constitute the subject matter of the copending application, Serial No. 649,967, referred to above.

In the application just referred to, the controls for circulation of the coolant, and the mechanism for dissipating the heat extracted thereby, are independent of the nature of the cooling jacket. For structural simplicity and for greater efficiency it has been found that a coolant conduit or coils, located within the stator casing, and in the path of normal circulation of at least part of the resistance liquid, affords an admirable device for effecting heat transfer between the resistance liquid and the coolant liquid. The present invention is directed to a structure of this nature. Thus in the present invention the manner of effecting or controlling circulation of the coolant liquid, or of dissipating the heat therefrom, or the manner of regulating supply of resistance liquid to the stator casing or its discharge therefrom, are all largely immaterial, and the present invention is concerned only with the structure of the dynamometer and the cooling conduit, and the mechanism of the dynamometer for effecting circulation of resistance liquid past and over the coolant conduit for heat interchange therebetween.

The general objects of the present invention have already been indicated. Among more specific objects it is an object to provide a construction, both of the rotor and of the stator, or either thereof, which will not unduly interfere with the primary toroidal circulation of the resistance liquid, but which will nevertheless insure circulation of a sufficient part of the resistance liquid past the coolant conduit to insure adequate transfer of heat from the resistance liquid to the coolant liquid.

More especially it is one of the specific objects of this invention so to locate the coolant conduit with relation to the rotor, and to provide the rotor with apertures, so arranged, that the resistance liquid in its radially outward movement within the cups of the rotor will discharge a part of the resistance liquid centrifugally outward from the rotor, onto or over the coolant conduit.

A further object is to provide the individual cups in the stator casing with baffle means, leading inwardly in the direction of the toroidal circulation from the coolant conduit space, such baffles being so disposed with relation to the main toroidal circulation as to afford adequate control thereof and to insure maximum effect therefrom, while at the same time serving, by the ejector effect of the toroidal circulation past an aperture, to eject resistance liquid from the coolant conduit space to rejoin the main toroidal circulation, and thereby to make room for discharge of additional heated resistance liquid over the coolant coils, and to increase the circulation rate of the resistance liquid over the coolant coils.

It is also an object to provide a structure and arrangement of parts which is mechanically simple and inexpensive, and well suited to the ends in view, having in mind such factors as the necessity of admitting and discharging coolant liquid from the coils, of admitting resistance liquid to, and of buiding up a pressure adjacent the discharge from, the stator casing, in order to vary the load, and of admitting or discharging air in order that the interior of the casing be not air-locked, and similar factors.

In the drawings the invention is shown in typical forms of construction, such as are presently preferred by me.

Figure 1 is in general an axial sectional view through a preferred form of the dynamometer, and Figures 2 and 3 are sections, respectively, on the lines 2—2 and 3—3 of Figure 1.

Figure 4:
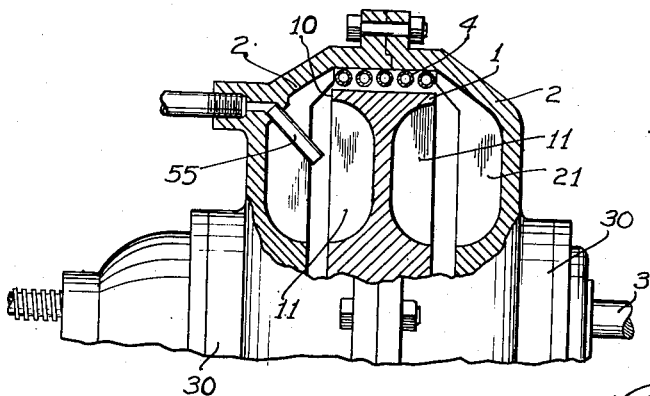

Figure 4 is a half-sectional view corresponding generally to Figure 1, and illustrating a different form of construction.

No attempt is made in the present drawings to show all structural or operational features of the dynamometer, for such dynamometers are in themselves well known, and such structural details, if desired, may be ascertained from the parent application, now Patent No. 2,428,005, or from the application Serial No. 649,967. It will be sufficient to note that a rotor 1 is carried upon a shaft 3, supported by bearings 30, and disposed within a stator casing 2 formed in two halves connected together, to which casing is connected a torque arm 29. The rotor has a plurality of radially disposed vanes 11, angled with respect to the axis, and the stator has a similar set of vanes 21, similarly disposed and angled. The vanes 11 and 21 and the cups which they define in the rotor and stator, respectively, are generally complemental and afford space within which the toroidal circulation of resistance liquid within the stator casing takes place.

The vanes of the stator extend radially outwardly beyond the peripheral rim 10 of the rotor 1, and then axially inwardly to overlie the rim 10. As is explained more fully in Patent No. 2,428,005, the discharge of toroidally circulating resistance liquid from the rotor cups, at the rotor's periphery especially at high speeds, is substantially radially outwardly, and such overhang of the stator vanes intercepts even such radially thrown liquid, and affords reaction vanes to absorb its force (which, incidentally, produces the heat which must be dissipated), and cups to guide its circulation again inwardly, in the general toroidal path. This the stator vanes and cups do satisfactorily, however, only if the radially outward flow in the stator cups does not dominate and reverse the radially inward flow which is an essential part of the general toroidal path. In practice this means that the radially outermost surface of the stator cups must not be spaced too greatly radially beyond the peripheral rim 10 of the rotor. Certain factors herein which relate to the cooling arrangements tend to extend the stator cups too far outwardly, wherefore other provisions must be made to lessen the distance without interfering with—indeed, with actual assistance to—the cooling arrangements.

Whereas in the parent Patent No. 2,428,005, the cooling was accomplished by circulation of a coolant through a water jacket, or, as shown herein in Figure 4, by its circulation through coils 4 within the stator casing, the coils as shown are of limited radial depth, and while they would not unduly displace radially the outside of the stator cups relative to the rotor cups, neither will they afford as much cooling capacity as may be needed with dynamometers of high absorptive capacity. Several banks of coils 4, arranged in radial depth in the space outside the rotor's periphery, are preferable, but, so situated, they tend to displace too far outwardly the outer ends of the stator cups, since into these stator cups the cooled resistance liquid must withdraw. Means, in the form of curved baffles 22, must be employed to form, as it were, a false bottom for each stator cup, to intercept resistance liquid thrown radially outwardly from the rotor peripheral rim 10, to direct it again radially inwardly, and to maintain normal toroidal circulation with the liquid so intercepted. The baffles, properly arranged have the further function of serving, by ejector action, to withdraw cooled resistance liquid from the space surrounding the coils 4, and to restore it to circulation in the normal toroidal path, with the uncooled, baffle-intercepted liquid.

The cooling conduit 4, of several coils or tubes, with its headers 41 and 42, one for inlet and the other for outlet of coolant liquid, is located, generally speaking, within some part of the circulation path of the resistance liquid. In the preferred form of Figures 1 to 3 inclusive the cooling conduit 4 is located in a by-pass from the normal toroidal circulation path of the resistance liquid. More specifically, it is located radially outwardly from, and peripherally surrounds, the rim 10 of the rotor 1. The resistance liquid, or some part thereof, gains access to the exterior of the coolant conduit by way of a series of radial apertures 12 in the periphery 10, from the individual rotor cups. Usually an appreciable part of the resistance liquid from each rotor cup discharges past the rim of the rotor's periphery, avoiding discharge from the apertures 12, but there are enough such apertures (though not necessarily one in each cup) to insure a substantial discharge therefrom over the cooling conduit 4.

The curved baffles 22 in each stator cup, as already explained, serve to intercept and direct inwardly the rim-discharged resistance liquid, and thus to maintain the normal toroidal circulation. These baffles 22 overlie the peripheral rim of the rotor, to intercept all rim discharge, and lie closely enough to the rotor's rim, and are curved inwardly to such extent, that they direct inwardly, in the normal toroidal path, all such rim discharge.

Additionally, each such baffle 22 is spaced from the outer wall of the stator cup to define a passageway 23, leading from the cooling conduit space inwardly to the central interior of the stator cup; moreover, this passageway 23 progressively narrows down, and the normal toroidal circulation passes over its narrow outlet. It follows that an ejector or jet action occurs at each such outlet, serving to suck cooled resistance liquid away from the cooling conduit 4, and to make room for heated resistance liquid about the cooling conduit. The so-withdrawn cooled resistance liquid mingles with the toroidally circulating resistance liquid, cooling it, which is the desired result. This process is repeated over and over rapidly, and since the coolant is being circulated through the conduits 4, the result is efficient cooling, and stabilization of the temperature of the resistance liquid is effected merely by regulating the rate of circulation of the coolant liquid, and its entering temperature.

Various connections to and control for the two liquids within the dynamometer are shown in the accompanying drawings for completeness of illustration, yet they have little or no bearing on the present invention. In order to afford a clearer understanding of the construction and operation it may be pointed out that the resistance water is discharged, for instance, at 25, the baffle 22 and passage 23 being omitted in this particular cup. The inlet for resistance water is not herein shown. The coolant is admitted on one side of the stator, as for instance at 45, and discharges at the opposite side, at 46, and at each such connection 45 and 46 the passage 23 is omitted completely. Air is admitted or discharged past a control valve 5 through the nozzles 55, and a thermostat 6 senses the temperature of the resistance liquid to control various operations, such as the rapidity of flow-through of the coolant within or flowing to or from the conduits 4, in a manner more fully set forth in various forms or arrangements in the copending application Serial No. 649,967. These devices and controls are not part of the present invention, but are illustrated for completeness and to show the manner in which they cooperate with, or interfere with the full utilization of the present invention.

Because it is necessary at times to withdraw resistance liquid from the casing during operation—for example, in order to vary the resistance or load—it is necessary to insure that the resistance liquid has adequate access to the outlet 25. The coils 4 must be held by spacers 40 against excessive vibration, and these spacers tend to intercept and hold back peripheral flow of resistance water. If a spacer 40 were located close to the outlet 25, desired outflow of resistance water would be impeded or blocked. Accordingly, the spacers 40 are omitted, in the direction of rotation, for some distance ahead of the outlet 25 (see Figure 3), and the outlet 25 is located just ahead of the headers 41, 42. The result is, the water attains peripheral momentum towards the outlet 25, which is checked by the headers, and a pressure head is thus built up at the outlet. When the valved outlet 25 is opened, evacuation of resistance water is prompt, because of this pressure head.

I claim as my invention:

1. In a Froude type dynamometer, a liquid-containing vaned stator casing and a complementally vaned rotor, a coolant-liquid-filled conduit disposed within the stator casing circumferentially about the rotor, and the rotor having means for directing at least part of the resistance liquid over said conduit prior to its rejoining the remainder thereof, for transfer of heat from the resistance liquid to the coolant liquid.

2. In a Froude type dynamometer, a liquid-containing stator casing radially vaned to define stator cups and a rimmed rotor complementally radially vaned to define rotor cups cooperative, when the rotor is rotating, with the stator cups to produce toroidal circulation of resistance liquid, a coolant-liquid-filled conduit disposed peripherally within the stator casing circumferentially about the rotor's periphery, and means in said stator including a portion lying in a horizontal plane common to that of the rim of the rotor to direct a portion of the resistance liquid from the rotor cups continuously over the coolant-filled conduit for transference of heat therebetween, and thence back to rejoin and cool the toroidally circulating resistance liquid.

3. In a Froude type dynamometer, a liquid-containing vaned stator casing and a complementally vaned rotor providing a toroidal circulation path, a coolant-liquid-filled conduit disposed peripherally within the stator casing adjacent the rotor's periphery, and means to direct at least a portion of the resistance liquid over said conduit for heat exchange therebetween, and means to induce flow of resistance liquid, after being thus cooled, away from said conduit, and into the toroidal circulation path.

4. In a Froude type dynamometer, a liquid-containing vaned stator casing and a complementally vaned rotor, a coolant-liquid-filled conduit disposed about the rotor's periphery, but within the casing, the rotor's periphery having a plurality of liquid-discharge apertures spaced about it, and directed towards said conduit, for discharge of a portion only of the circulating resistance liquid over the conduit, and for extraction of heat from such resistance liquid.

5. In a Froude type dynamometer, a liquid-containing vaned stator casing and a complementally vaned rotor, a coolant-liquid-filled conduit disposed about the rotor's periphery, but within the casing, the rotor's periphery having a plurality of liquid-discharge apertures spaced about it, and directed towards said conduit, for discharge of a portion only of the circulating resistance liquid over the conduit, and for extraction of heat from such resistance liquid, and means activated by the normal internal circulation of the resistance liquid for inducing flow of resistance liquid away from said conduit.

6. In a Froude type dynamometer, a liquid-containing stator and a rotor therein, the stator and rotor being complementally radially vaned to provide cups for toroidal circulation of resistance liquid within the casing, a coolant-liquid-filled conduit peripherally surrounding the rotor within the stator casing, the rotor's periphery being apertured at intervals for discharge centrifugally of resistance liquid over said conduit, and a baffle spaced from the outer wall of the stator's cups to define therebetween an ejector passage leading from the conduit space to the toroidal circulation space, and shaped and located relative to the rotor's cups to receive discharge therefrom and to direct the same radially inwardly, as part of the principal toroidal circulation.

7. In a Froude type dynamometer, a rotor having radial vanes defining cups, a stator casing surrounding, and spaced distantly from the periphery of said rotor to provide space for coolant conduit means, coolant conduit means in the space between the rotor's periphery and the stator, the stator being vaned similarly to the rotor, to define cups terminating at their outer ends beyond the rotor's periphery and in communication with the conduit-containing space, and bleed ports in the rotor's periphery for discharge of a part of the resistance liquid from the rotor's cups into the conduit-containing space.

8. In a Froude type dynamometer, a rotor having radial vanes defining cups, a stator casing surrounding, and spaced distantly from the periphery of, said rotor, coolant conduit means in the space between the rotor's periphery and the stator, the stator being vaned similarly to the rotor, to define cups terminating at their outer ends beyond the rotor's periphery, in communication with the conduit-containing space, bleed ports in the rotor's periphery for discharge of a part of the resistance liquid from the rotor's cups into the conduit-containing space, and a baffle spaced from the outer wall of the stator cups, and curved inwardly from a terminus adjacent the conduit-containing space to a terminus adjacent the rotor's periphery.

9. In a Froude type dynamometer, a rotor having radial vanes defining cups, a stator casing surrounding, and spaced distantly from the periphery of, said rotor, coolant conduit means in the space between the rotor's periphery and the stator, the stator being vaned similarly to the rotor, to define cups terminating at their outer ends beyond the rotor's periphery, in communication with the conduit-containing space, bleed ports in the rotor's periphery for discharge of a part of the resistance liquid from the rotor's cups into the conduit-containing space, and a baffle between the several stator vanes, spaced from the outer wall of the stator cups, and curved inwardly from a terminus overlying but spaced outwardly of the rotor's peripheral rim to a terminus adjacent but spaced axially from said rim.

10. A dynamometer as in claim 9, wherein the spacing between the baffle and the walls of its stator cup varies from a wide entrance, adjacent the conduit-containing space, to a narrow exit adjacent the rotor's peripheral rim.

11. In a Froude type dynamometer, a rotor having radial vanes defining cups, a stator casing surrounding, and spaced outwardly from the periphery of, said rotor, a plurality of coolant-filled coils peripherally surrounding the rotor's periphery, in such space, spacers at intervals embracing the coils to restrain their relative movement, the stator being vaned similarly to the rotor to define cups complemental to the rotor cups, for toroidal circulation of a resistance liquid contained within the stator casing, a resistance liquid outlet located in the coil-containing space, and bleed ports in the rotor's periphery for discharge of a part of the toroidally circulating resistance liquid into the coil-containing space, the coil-restraining spacers being omitted, in advance of the resistance liquid outlet, to facilitate peripheral movement of resistance liquid towards said outlet.

12. In a Froude type dynamometer, a rotor having radial vanes defining cups, a stator casing surrounding, and spaced outwardly from the periphery of, said rotor, a plurality of coolant-filled coils peripherally surrounding the rotor's periphery, in such space, spacers at intervals embracing the coils to restrain their relative movement, the stator being vaned similarly to the rotor to define cups complemental to the rotor cups, for toroidal circulation of a resistance liquid contained within the stator casing, a resistance liquid outlet located in the coil-containing space, bleed ports in the rotor's periphery for discharge of a part of the toroidally circulating resistance liquid into the the coil-containing space, the coil-restraining spacers being omitted, in advance of the resistance liquid outlet, to facilitate peripheral movement of resistance liquid towards said outlet, and a header for said coils disposed immediately beyond said outlet to intercept peripheral movement of the resistance liquid, and to build up pressure in the vicinity of said outlet.

HAROLD L. BENNETT.

References Cited in the file of this patent

UNITED STATES PATENTS

| Number | Name | Date |
|---|---|---|
| 2,164,173 | Durrell et al. | June 27, 1939 |
| 2,358,825 | Pribula | Sept. 26, 1944 |
| 2,361,726 | Weimar | Oct. 31, 1944 |
| 2,425,171 | Bennett et al. | Aug. 5, 1947 |
| 2,428,005 | Bennett | Sept. 30, 1947 |

FOREIGN PATENTS

| Number | Country | Date |
|---|---|---|
| 307,022 | Great Britain | Aug. 15, 1929 |
| 466,436 | Great Britain | May 28, 1937 |
| 75,955 | Austria | Mar. 26, 1919 |
| 316,482 | Italy | Apr. 7, 1934 |